(12) United States Patent
Shaw et al.

(10) Patent No.: US 7,657,463 B1
(45) Date of Patent: Feb. 2, 2010

(54) SYSTEMS AND METHODS FOR DELIVERING ITEM PRICE NOTIFICATIONS TO A MOBILE DEVICE

(75) Inventors: Richard Shaw, Alpharetta, GA (US); Justin McNamara, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/337,006

(22) Filed: Dec. 17, 2008

(51) Int. Cl.
*G06F 17/60* (2006.01)

(52) U.S. Cl. .............................. 705/26; 705/14; 705/22; 705/27; 705/400

(58) Field of Classification Search .................. 705/26, 705/27, 14, 22, 400
See application file for complete search history.

(56) References Cited

U.S. PATENT DOCUMENTS

| | | | |
|---|---|---|---|
| 6,292,786 B1 * | 9/2001 | Deaton et al. .................. | 705/14 |
| 6,694,300 B1 * | 2/2004 | Walker et al. .................. | 705/14 |
| 7,130,814 B1 * | 10/2006 | Szabo et al. .................... | 705/26 |
| 7,184,990 B2 * | 2/2007 | Walker et al. ............... | 705/400 |
| 2002/0016739 A1 * | 2/2002 | Ogasawara .................... | 705/22 |
| 2002/0133424 A1 * | 9/2002 | Joao .............................. | 705/26 |
| 2002/0178088 A1 * | 11/2002 | Lurie et al. .................... | 705/26 |
| 2003/0158796 A1 * | 8/2003 | Balent .......................... | 705/28 |
| 2004/0054634 A1 * | 3/2004 | Tak .............................. | 705/400 |
| 2004/0056101 A1 * | 3/2004 | Barkan et al. ........... | 235/472.03 |
| 2005/0004819 A1 * | 1/2005 | Etzioni et al. ................... | 705/5 |
| 2008/0033862 A1 * | 2/2008 | Ehsani .......................... | 705/37 |
| 2008/0270251 A1 * | 10/2008 | Coelho et al. ................. | 705/26 |
| 2008/0301009 A1 * | 12/2008 | Plaster et al. ................. | 705/28 |

OTHER PUBLICATIONS

The Search for Shelf Life Solutions. Food Technology, (61/11), 66. Leake, L. (Nov. 2007).*

* cited by examiner

*Primary Examiner*—Jeffrey A Smith
*Assistant Examiner*—Courtney Stopp
(74) *Attorney, Agent, or Firm*—Parks IP Law LLC; Jonathan A. Paulis

(57) ABSTRACT

An exemplary system for delivering an item price notification to a mobile device can include a processor, an inventory database including a plurality of inventory items, and a memory that is in communication with the processor. The memory can be configured to store instructions that, when executed, perform the steps of an exemplary method. An exemplary method can include querying the inventory database to determine if an inventory item meets a price reduction threshold, generating the item price notification including a sale price for the inventory item, if the inventory item meets the price reduction threshold, and transmitting the item price notification to the mobile device. The query can be invoked by the mobile device being proximate the inventory item, such as the mobile device being located at a merchant premises.

23 Claims, 6 Drawing Sheets

SYSTEMS AND METHODS FOR DELIVERING ITEM PRICE NOTIFICATIONS TO A MOBILE DEVICE

TECHNICAL FIELD

The present disclosure relates generally to telecommunications networks and, more particularly, to systems and methods for delivering item price notifications to a mobile device.

BACKGROUND

The Internet has redefined many industries and the advertising industry is no different. Internet advertising is quickly becoming a popular and cost effective solution for advertising. Other electronic advertising mediums, such as broadcast television, cellular television, Internet video, video game, and wireless messaging, are also gaining momentum in the global advertising market.

Advertising through wireless messaging allows businesses to target consumers by sending electronic advertisements to mobile phones using popular wireless technologies, such as wireless application protocol (WAP), short message service (SMS), multimedia message service (MMS), and unstructured supplementary service data (USSD). The ubiquitous nature of mobile phones has prompted many businesses to leverage the inherent mobility of these devices to provide targeted ads based upon the location of the mobile device. Rather than relying on a customer to remember an advertisement, a mobile advertisement can be sent to a consumer's mobile device when the consumer is at a location near the business, potentially luring the consumer to purchase the advertised goods or services.

SUMMARY

Systems for delivering an item price notification to a mobile device and methods for operating such systems are described herein. In one exemplary embodiment of the present disclosure, a method for delivering an item price notification to a mobile device can include querying an inventory database to determine if an inventory item meets a price reduction threshold, generating the item price notification including a sale price for the inventory item, if the inventory item meets the price reduction threshold, and transmitting the item price notification to the mobile device.

In some embodiments, the method can further include updating the inventory database to reflect the sale price for the inventory item. The update can be temporary or permanent.

In some embodiments, the price reduction threshold can include a threshold date on or before an expiration date of the inventory item. In other embodiments, the price reduction threshold can include a threshold quantity for the inventory item.

In some embodiments, the method can further include accessing a purchase history for a customer. In this embodiment, the querying step can be performed based upon a previously purchased inventory item identified in the purchase history.

In some embodiments, the querying step is invoked by a shopping list received from the mobile device and the querying is performed based upon a list item identified in the shopping list. In other embodiments, the querying step is invoked by a customer information card being swiped at a terminal. In other embodiments, the querying step is invoked by the mobile device being located proximate the inventory item.

In some embodiments, the item price notification is transmitted to the mobile device via a wireless communications network using a wireless messaging protocol, such as short message service (SMS) messaging, enhanced message service (MMS) messaging, multimedia message service (MMS) messaging, unstructured supplementary service data (USSD) messaging, and the like.

In another embodiment of the present disclosure, a system for delivering an item price notification to a mobile device can include a processor, an inventory database, and a memory that is in communication with the processor. The memory can be configured to store instructions that, when executed, perform the steps of aforementioned method.

In another embodiment of the present disclosure, a computer-readable medium that includes computer-executable instructions that, when executed, can perform the steps of the aforementioned method.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
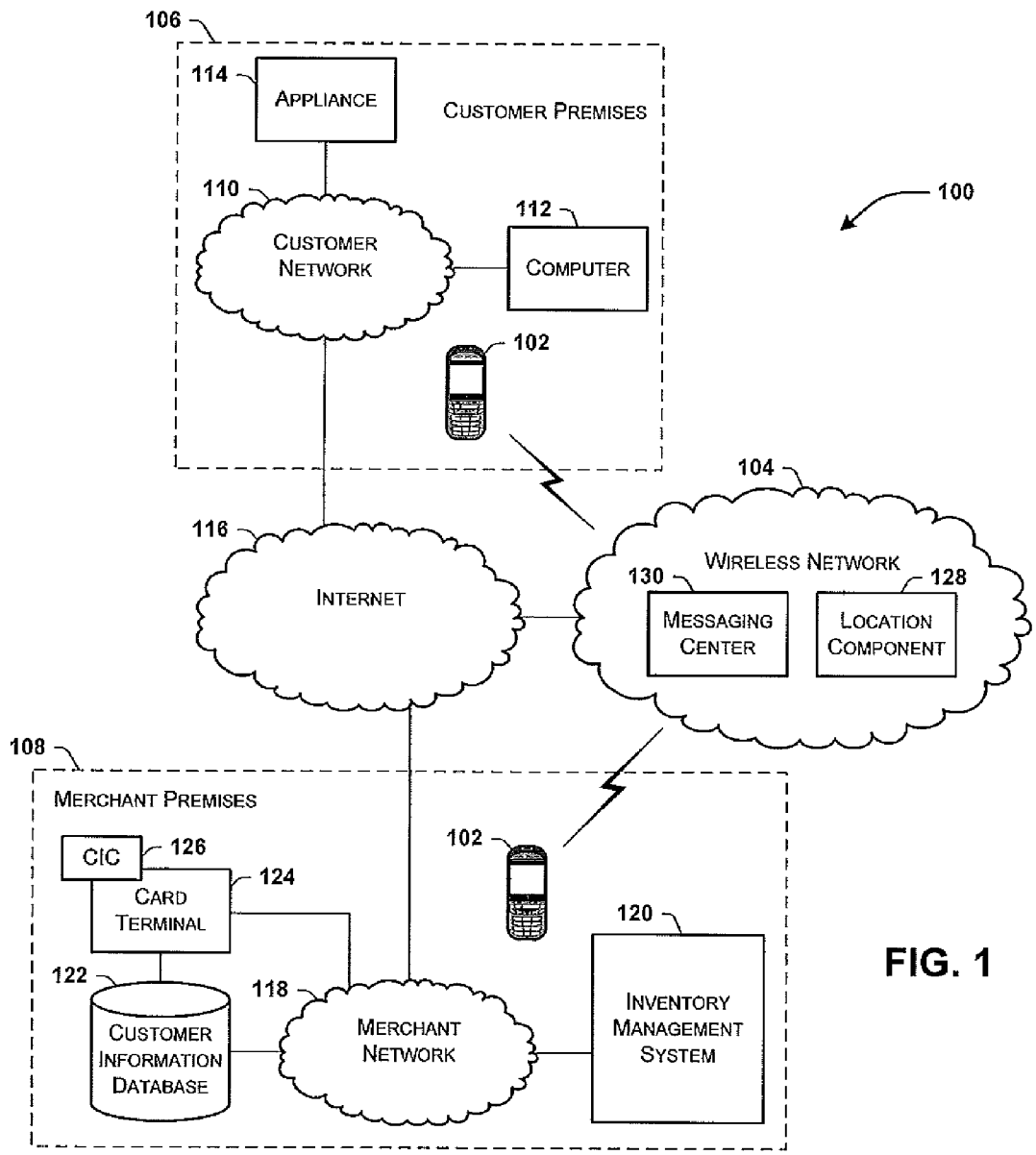
FIG. 1 illustrates an exemplary communications network in which the present disclosure can be implemented.

Referring now to the drawings wherein like numerals represent like elements throughout the several views, FIG. 1 illustrates an exemplary communications network 100 in which the present disclosure can be implemented. The illustrated communications network 100 includes a mobile device 102 that is in communication with a wireless network 104.

The mobile device 102 can be a cellular telephone, a personal digital assistant, a handheld computing device, a computer, a global positioning system (GPS) unit, a video game system, a music player, a video player, combinations thereof, and the like. An exemplary mobile device 102 and components thereof is described herein below with reference to FIG. 2.

The wireless network 104 can operate using any existing or yet to be developed telecommunications technology. The wireless network 104 can provide voice service via telecommunications technologies including, but not limited to, networks utilizing Time Division Multiple Access (TDMA), Frequency Division Multiple Access (FDMA), Global System for Mobile communications (GSM), Universal Mobile Telecommunications System (UMTS), Wideband Code Division Multiple Access (WCDMA), Orthogonal Frequency Division Multiplexing (OFDM), and various other 2G, 2.5G and 3G (third generation) and above (4G and beyond) technologies. The wireless network 104 can also provide data service via telecommunications technologies including, but not limited to, Generic Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data technologies.

The illustrated communications network 100 further includes a customer premises 106 and a merchant premises 108. The illustrated customer premises 106 includes a customer network 110, a computer 112 and an appliance 114. The customer network 110 can include a router (not shown) to network the computer 112 and the appliance 114 for communication within the customer network 110. The customer network 110 can also include a modem (not shown) for communication with external networks, such as, for example, the Internet 116 via digital subscriber line (DSL), cable, and dial-up technologies.

The computer 112 can allow a user (customer) to create and manage a shopping list to keep track of items needed from the merchant premises 108. The appliance 114 can include a networked appliance, such as, but not limited to, a smart refrigerator or smart pantry. The appliance 114 can be configured to interact with radio frequency identification (RFID) tags on items to create and manage a stock list. Items that are depleted can be flagged as "needed" and added to a shopping list according to a user's preferences. The appliance 114 can include a processor, a memory, and input/output interfaces as a self-contained computer system. The user can also interact with the appliance 114 via a built-in display or other physical user interface. Alternatively, information, such as shopping list items, can be shared with the computer 112 via the customer network 110 and the user can interact with the computer 112 to manage a shopping list.

The customer network 110 can be a local area network (LAN) and/or wireless LAN (WLAN) operated using IEEE 802.3 (Ethernet) and IEEE 802.11x (WIFI) standards, for example. The mobile device 102 can be configured to communicate with the computer 112 and/or the appliance 114 via a wired or wireless connection to receive a shopping list. The mobile device 102 can connect to the computer 112 or the appliance 114 via a universal serial bus (USB), IEEE 1394 (Firewire), BLUETOOTH, IEEE 802.3, IEEE 802.11x, RFID, near field communication (NFC), proprietary connection, combinations thereof, and the like to receive a shopping list.

The illustrated merchant premises 108 includes a merchant network 118 that is in communication with the Internet 116. The merchant network 118 can include a router (not shown) to connect an inventory management system 120, a customer information database 122, and a card terminal 124. The merchant network 118 can be a LAN and/or WLAN operated using IEEE 802.3 and IEEE 802.11x standards, for example.

The inventory management system 120 is configured to manage merchant inventory and update inventory prices based upon inventory quantities, expiration dates, and other criteria related to one or more predefined price reduction thresholds. The inventory management system 120 can be configured to monitor the inventory items to determine when an inventory item meets the price reduction threshold. The inventory management system 120 can allow the merchant to react to short term conditions in the merchant premises 108 to manage sales on inventory items in near real-time. The inventory management system 120 can operate automatically to detect price reduction thresholds for inventory items and reduce an inventory item's price according to a merchant's preferences. The inventory management system 120 can also be accessed by a merchant representative who can enter a sale price for an inventory item.

A merchant representative can set price reduction threshold parameters including a trigger parameter, such as a quantity or an expiration date, and other parameters, such as a price reduction amount. Multiple price reduction thresholds can be set. Price reduction parameters can be set based upon item SKU, item type, brand, previously reduced items, customer-specific items, and like categories. An exemplary inventory management system 120 and components thereof is described herein below with reference to FIG. 3.

In one embodiment, a price reduction threshold includes a quantity threshold. When an inventory item meets a quantity threshold, the inventory management system 120 can assign a sale price for the item consistent with a price reduction parameter, and generate an item price notification that includes a sale price for the item. The item price notification can be sent to the mobile device 102 via the merchant network, the Internet 116, and/or the wireless network 104.

In another embodiment, a price reduction threshold includes an expiration threshold. An expiration threshold can include a date before, after or on the expiration date for an item. When the present date reaches the expiration threshold date, the inventory management system 120 can assign a sale price for the item consistent with a price reduction parameter, and generate an item price notification that includes a sale price for the item.

The customer information database 122 can be configured to store customer purchase histories. The customer information database 122 can share purchase histories with the inventory management system 120 such that the inventory management system 120 can determine if any inventory items in a customer's purchase history meet a price reduction threshold. It is contemplated that the inventory management system 120 can provide suggestions to the customer for like items and companion items including such items that meet a price reduction threshold. The customer information database 122 can also include name, address, telephone number, email, and other information about customers. The customer information database 122 can include membership details for membership programs.

The customer information database 122 can communicate with the card terminal 124. A customer can swipe customer information card (CIC) 126 at the card terminal 124 to notify the inventory management system 120 that the customer wishes to receive item price notifications for items that meet a price reduction threshold.

The wireless network 104 can determine the location of the mobile device 102 via a location component 128 and corresponding device components (described with reference to FIG. 2) using techniques such as, for example, cellular triangulation, WIFI triangulation, GPS, assisted GPS, combinations thereof, and the like. The merchant premises 108 can be identified based upon the location of the mobile device 102. Based upon the mobile device 102 being proximate the merchant premises 108, the wireless network 104 can generate and send a message, via a messaging center 130, to the inventory management system 120. The message can notify the inventory management system 120 that the customer wishes to receive item price notifications for items that meet a price reduction threshold. The mobile device 102 can be set to report its location when near one or more favorite merchants and to request item price notifications for items offered by those merchants.

Figure 2:
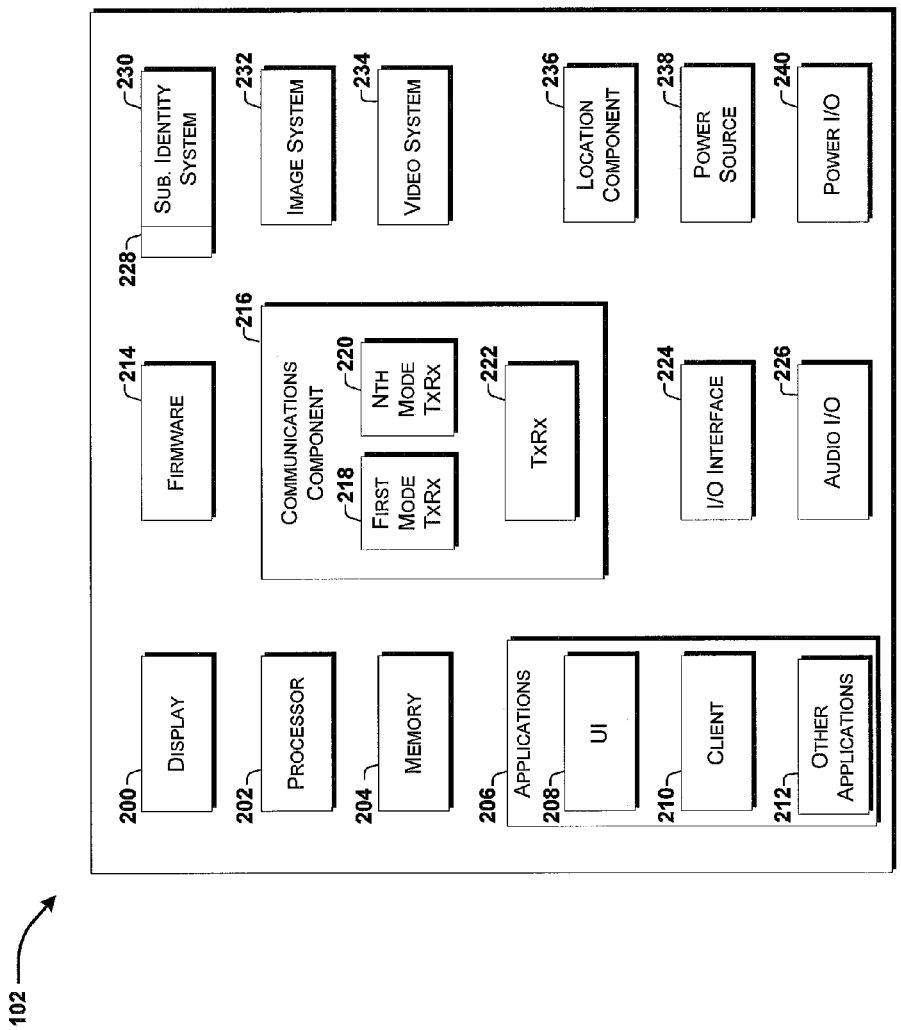
FIG. 2 illustrates a mobile device and components thereof, according to an exemplary embodiment of the present disclosure.

FIG. 2 illustrates a schematic block diagram of an exemplary device 102 for use in accordance with some exemplary embodiments of the present disclosure. Although no connections are shown between the components illustrated in FIG. 2, the components can interact with each other to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 102 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 102.

The device 102 can include a display 200 for displaying multimedia such as, for example, text, images, video, telephony functions such as Caller ID data, setup functions, menus, music, metadata, messages, wallpaper, graphics, Internet content, device status, preferences settings, map and location data, and the like. The device 102 can include a processor 202 for controlling, and/or processing data. A memory 204 can interface with the processor 202 for the storage of data and/or applications 206.

An application 206 can include, for example, SMS messaging software, EMS messaging software, MMS messaging software, USSD software, a WAP browser, and the like. The application 206 can also include a user interface (UI) application 208. The UI application 208 can interface with a client 210 (e.g., an operating system) to facilitate user interaction with device functionality and data, for example, entering message content, viewing received messages, answering/initiating calls, entering/deleting data, password entry and setting, configuring settings, address book manipulation, and the like. The applications 206 can include other applications 212 such as, for example, add-ons, plug-ins, email applications, music applications, video applications, camera applications, location-based service (LBS) applications, power conservation applications, game applications, productivity applications, entertainment applications, combinations thereof, and the like, as well as subsystems and/or components. The applications 206 can be stored in the memory 204 and/or in a firmware 214, and can be executed by the processor 202. The firmware 214 can also store code for execution during initialization of the device 102.

A communications component 216 can interface with the processor 202 to facilitate wired/wireless communications with external systems including, for example, cellular networks, location systems, VoIP networks, local area networks (LAN's), wide area networks (WAN's), metropolitan area networks (MAN's), personal area networks (PAN's), and other networks, which can be implemented using WIFI, WIMAX, combinations and/or improvements thereof, and the like. The communications component 216 can also include a multimode communications subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers can be included. The communications component 216 can also include a transceiver 222 for other communications technologies such as, for example, WIFI, WIMAX, BLUETOOTH, infrared, IRDA, NFC, RF, and the like. The communications component 216 can also facilitate reception from terrestrial radio networks, digital satellite radio networks, Internet-based radio services networks, combinations thereof, and the like. The communications component 216 can process data from a network such as, for example, the Internet 116, the customer network 110, the merchant network 118, a corporate intranet, a home broadband network, a WIFI hotspot, and the like, via an ISP, DSL provider, or broadband provider. The communications component 216 can be used to transmit a shopping list from the mobile device 102 to the inventory management system 120, for example.

An input/output (I/O) interface 224 can be provided for input/output of data and/or signals. The I/O interface 224 can be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 224 can be used for communications between the device and a network or local device, instead of, or in addition to, the communications component 216.

Audio capabilities can be provided by an audio I/O component 226 that can include a speaker for the output of audio signals and a microphone to collect audio signals. The device 102 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 102 can include an image capture and processing system 232 (image system). Photos and/or videos can be obtained via an associated image capture subsystem of the image system 232, for example, a camera. The device 102 can also include a video system 234 for capturing, processing, recording, modifying, and/or transmitting video content.

A location component 236, can be included to send and/or receive signals such as, for example, GPS data, A-GPS data, WIFI/WIMAX and/or cellular network triangulation data, combinations thereof, and the like. The location component 236 can interface with cellular network nodes, telephone lines, satellites, location transmitters and/or beacons, wireless network transmitters and receivers, for example, WIFI hotspots, radio transmitters, combinations thereof, and the like. The device 102 can obtain, generate, and/or receive data to identify its location, or can transmit data used by other devices to determine the device 102 location. The location of the device 102 can prompt the inventory management system 120 to determine if any item price notifications should be sent to the device 102. The location can be inside the merchant premises 108 or near the merchant premises 108 within a specified distance.

The device 102 can include a power source 238 such as batteries and/or other power subsystem (AC or DC). The power source 238 can interface with an external power system or charging equipment via a power I/O component 240.

Figure 3:
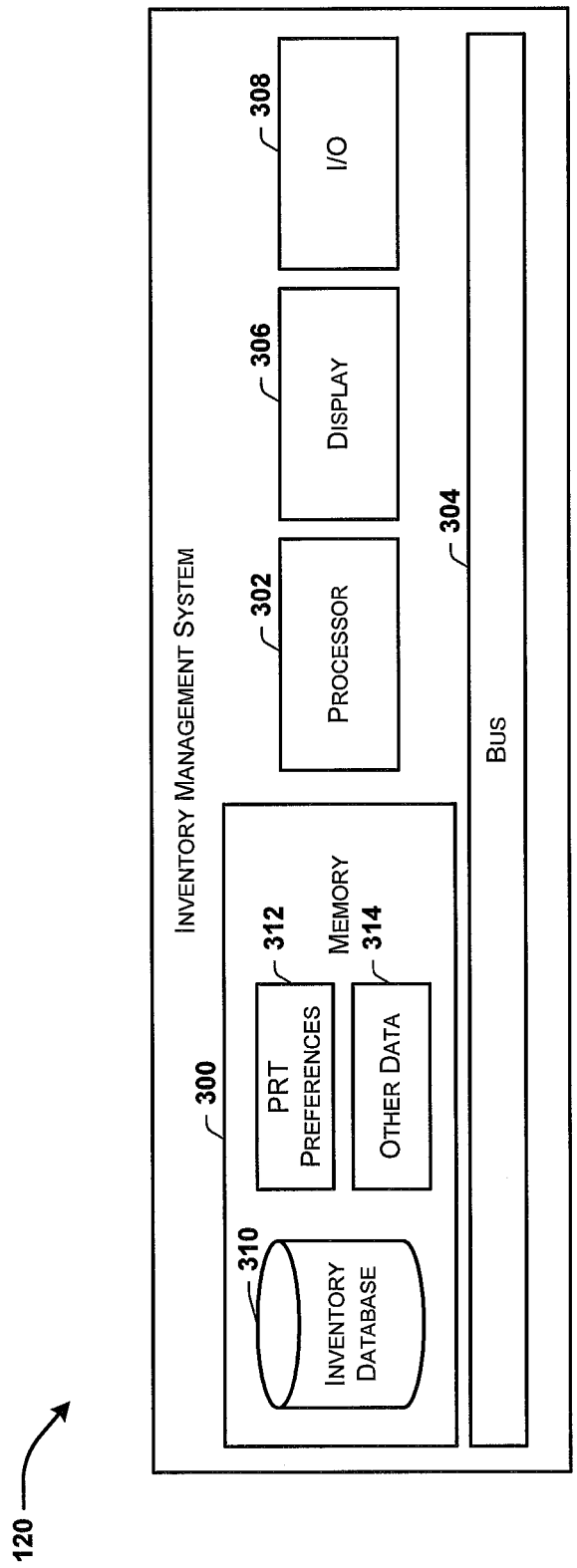
FIG. 3 illustrates an inventory management system and components thereof, according to an exemplary embodiment of the present disclosure.

Referring now to FIG. 3, an inventory management system 120 and components thereof is illustrated, according to the present disclosure. The inventory management system 120 can be a combination of hardware and software. The inventory management system 120 can be operated by a merchant, a wireless service provider, or a third party. The illustrated inventory management system 120 includes one or more memory modules 300 that can be operatively linked and in communication with one or more processors 302 via one or more data/memory busses 304. The illustrated inventory management system 120 also includes one or more displays 306 and one or more input/output devices 308 that can be operatively linked and in communication with the processor 302 and the memory module 300 via the data/memory bus 304. A display 306 can be a cathode ray tube (CRT) display, an LCD display, a plasma display, a digital light processing (DLP) display, a light emitting diode (LED) display, an organic LED (OLED) display, a touch input display, a multi-touch input display, combinations thereof, and the like. The input/output devices 308 can include, but are not limited to, a mouse, a trackball, a trackpad, a controller, a joystick, a keyboard, a keypad, a touchscreen, a multi-touchscreen, a printer, a plotter, a merchant network interface, a wireless network interface, combinations thereof, and the like.

The word "memory," as used herein to describe the memory 300, collectively includes all memory types associated with the inventory management system 120 such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory 300 is illustrated as residing proximate the processor 302, it should be understood that the memory 300 can be a remotely accessed storage system, for example, a local server, an Internet server, a remote hard disk drive, a removable storage medium, combinations thereof, and the like. Moreover, the memory 300 is intended to encompass network memory and/or other storage devices in wired or wireless communication with the inventory management system 120, which may utilize an I/O network interface 308 to facilitate such communication. Thus, any of the preferences, data, applications, and/or software described below can be stored within the memory 300 and/or accessed via network connections to other data processing systems (not shown) that may include a LAN, a metropolitan area network (MAN), or a wide area network (WAN), for example. Accordingly, the present disclosure may operate on the inventory management system 120, wherein the inventory management system 120 is configured as a server to one or more client data processing systems as dictated by a client/server model. The illustrated memory 300 includes an inventory database 310, one or more price reduction threshold preferences 312, and other data 314.

The inventory database 310 can be configured to store information related to one or more inventory items sold by a merchant, such as, but not limited to, item name, item description, item original price, item sale price, item quantity, item brand, item supplier, date received, expiration date, overstock quantity, related items, and any price reduction thresholds associated with an item.

The price reduction threshold preferences 312 can be set by a merchant representative to manage stock inventory on-the-fly or automatically over time. A merchant representative can access the inventory management system 120 to query the inventory database to determine when an inventory item meets a price reduction threshold. If the inventory item meets the price reduction threshold, the inventory management system 120 can generate an item price notification and send the item price notification, via the network I/O interface 308, to the wireless network 104 for delivery as a message to the mobile device 102. The price reduction threshold preferences 312 can be defined based upon item name, item description, item original price, item quantity, overstock quantity, expiration date, item brand, item supplier, seasonal discounts, date received, and the like.

It is contemplated that the inventory management system 120 can be configured to store applications to perform steps of the methods described herein below. Applications can include, for example, programs, routines, subroutines, algorithms, software, tools, and the like. For example, applications can include a user interface application for allowing a user, such as a merchant representative to define price reduction thresholds 312.

Other data 314 can include other sale information, such as from weekly circulars, and the like. Other data 314 can also include item price notifications previously sent to one or more customers, for example, within a specified time frame. These item price notifications can be queued for sending to other customer's devices rather than querying the inventory database 310 multiple times to determine if price reduction thresholds have been met for various inventory items.

Figure 4:
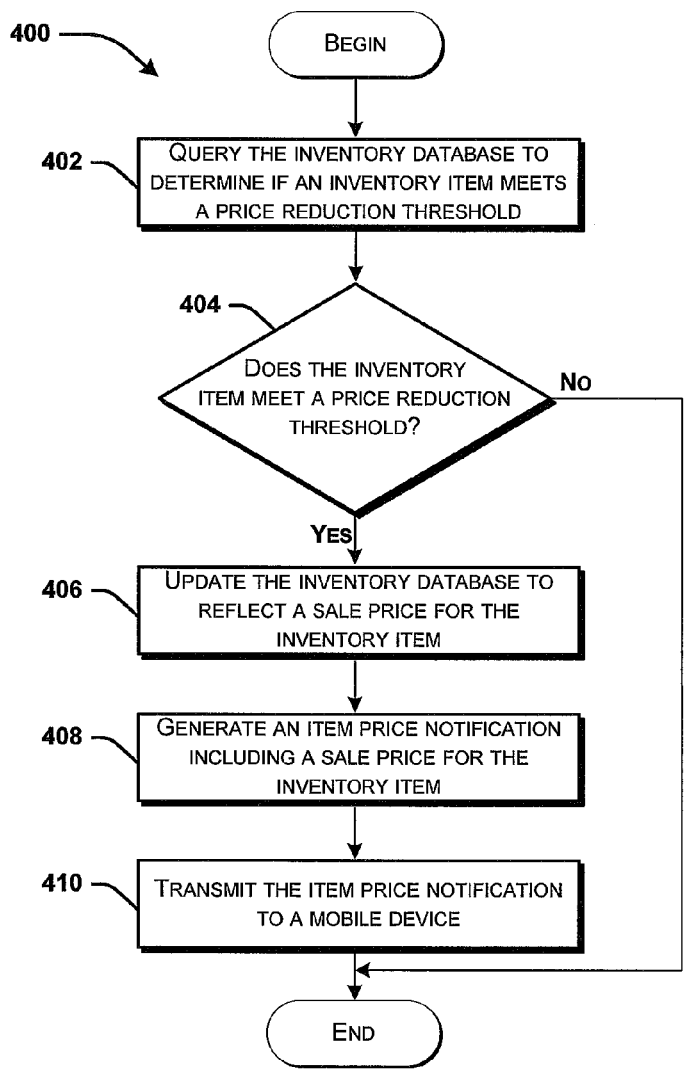
FIG. 4 illustrates a method for providing an item price notification to a mobile device, according to an exemplary embodiment of the present disclosure.

Referring now to FIG. 4, a method 400 for providing an item price notification to a mobile device 102 is illustrated, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins and flow proceeds to block 402, wherein the inventory database 310 is queried to determine if an inventory item meets a price reduction threshold. At block 404, the inventory database 310 searches the inventory item stock to determine if any items meet any price reduction threshold previously defined, for example, in the price reduction threshold preferences 312. If no inventory item meets a price reduction threshold, the method 400 can end. Otherwise, flow can proceed to block 406, wherein the inventory database 310 can be updated to reflect a sale price for the inventory item. At block 408, the inventory management system 120 can generate an item price notification. The item price notification can include the sale price for the inventory item. At block 410, the item price notification can be transmitted to the mobile device 102 via the merchant network 118, the Internet 116, or the wireless network 104, for example. The method 400 can end.

In one embodiment, the item price notification is transmitted to the mobile device 102 via a wireless connection, such as IEEE 802.11x, established between the mobile device 102 and the merchant network 118. When the mobile device 102 establishes a connection with the merchant network 118, a router (not shown) can assign an Internet protocol (IP) address for the mobile device 102. The IP address can be associated with a customer in the customer information database 122 and updated or reassigned for future communication sessions. In some embodiments, a customer swipes a CIC 126 at a card terminal 124 to notify the inventory management system 120 that the customer wishes to receive item price notifications. A customer's preference for item price notifications can be stored, for example, in the customer information database 122. The customer can provide a device identifier, such as a telephone number, so that the customer information database 122 can access the customer's profile via a search function using the telephone number as the search query, and update the customer's profile to include the IP address. Any item price notifications can be sent to the IP address stored for customer and the mobile device 102.

In another embodiment, the item price notification is transmitted to the mobile device 102 via a wireless connection established between the mobile device 102 and the wireless network 104. The inventory management system 120 can submit the item price notification via the Internet 116, for example, and the messaging center 130 can generate a message, such as, but not limited to, an SMS, EMS, MMS, or USSD message and send the message to the mobile device 102.

Figure 5:
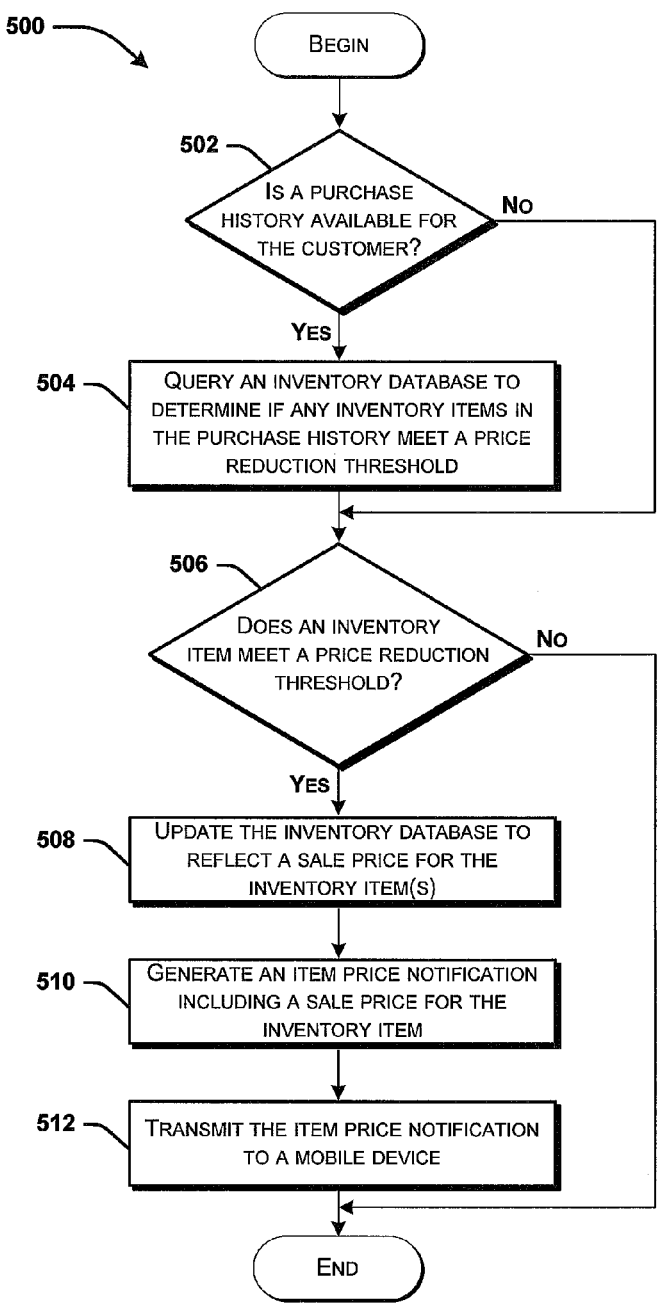
FIG. 5 illustrates a method for providing an item price notification to a mobile device, according to another exemplary embodiment of the present disclosure.

Referring now to FIG. 5, a method 500 for providing an item price notification to a mobile device is illustrated, according to another exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

The method 500 begins and flow proceeds to determination block 502, wherein it is determined if a purchase history is available for the customer. In some embodiments, the customer swipes a CIC 126 at the card terminal 124, prompting a query to the customer information database 122 to determine if the customer's purchase history is available. If the customer's purchase history is available, flow can proceed to block 504, wherein the inventory database 310 can be queried to determine if any inventory items in the customer's purchase history meet a price reduction threshold. At block 506, the inventory database 310 searches the inventory item stock to determine if any items in the customer's purchase history meet any price reduction threshold previously defined, for example, in the price reduction threshold preferences 312. If no inventory item meets a price reduction threshold, the method 500 can end. Otherwise, flow can proceed to block 508, wherein the inventory database can be updated to reflect a sale price for the inventory item. At block 510, the inventory management system 120 can generate an item price notification. The item price notification can include the sale price for the inventory item. At block 512, the item price notification can be transmitted to the mobile device 102 via the merchant network 118, the Internet 116, or the wireless network 104, for example. The method 500 can end.

Figure 6:
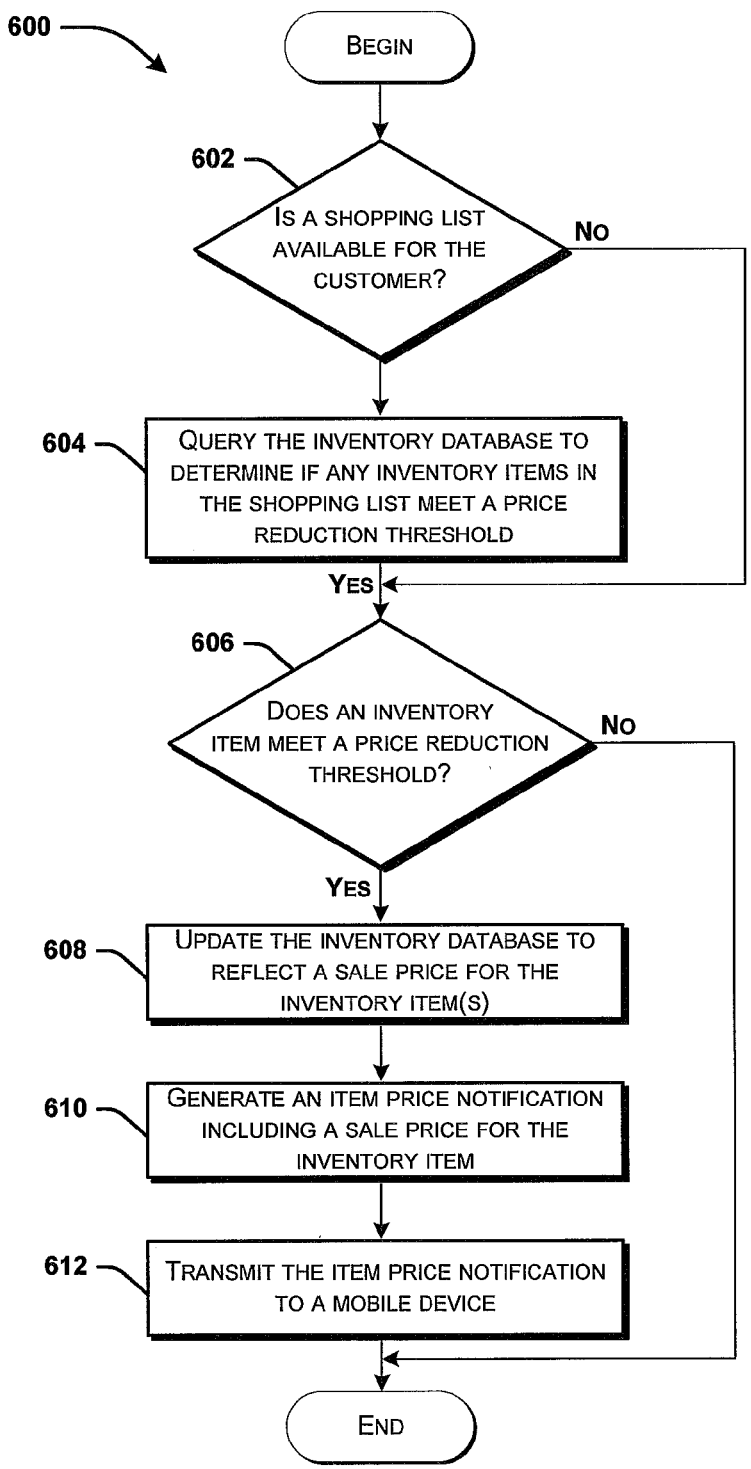
FIG. 6 illustrates a method for providing an item price notification to a mobile device, according to another exemplary embodiment of the present disclosure.

Referring now to FIG. 6, a method for providing an item price notification to a mobile device is illustrated, according to an exemplary embodiment of the present disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

The method 600 begins and flow proceeds to determination block 602, wherein it is determined if a shopping list is available for the customer. In some embodiments, the customer is prompted to electronically submit a shopping list if available. For example, a message can be sent to the mobile device 102 via the merchant network 118, the Internet 116, or the wireless network 104, prompting the customer to submit a shopping list. If the customer has a shopping list, the customer can instruct the mobile device 102 to send the shopping list to the inventory management system 120 via the merchant network 118, for example. In some embodiments, the customer can submit a shopping list via a web interface provided by the wireless network provider and/or the merchant. In some embodiments, the customer can use the computer 112 and/or the appliance 114 to submit a shopping list to the merchant via the Internet 116. If a shopping list is available, flow can proceed to block 604, wherein the inventory database 310 can be queried to determine if any inventory items in the customer's shopping list meet a price reduction threshold. At block 606, the inventory database 310 searches the inventory item stock to determine if any items meet any price reduction threshold previously defined, for example, in the price reduction threshold preferences 312. If no inventory item meets a price reduction threshold, the method 600 can end. Otherwise, flow can proceed to block 608, wherein the inventory database 310 can be updated to reflect a sale price for the inventory item. At block 610, the inventory management system 120 can generate an item price notification. The item price notification can include the sale price for the inventory item. At block 612, the item price notification can be transmitted to the mobile device 102 via the merchant network 118, the Internet 116, or the wireless network 104, for example. The method 600 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for delivering an item price notification to a mobile device, the method comprising:
   an inventory management system monitoring, in response to receiving a shopping list from the mobile device, an inventory database to determine if a present date is within an expiration threshold assigned to an inventory item identified in the shopping list, the expiration threshold comprising an expiration date for the inventory item;
   determining, by the inventory management system, that the present date is within the expiration threshold assigned to the inventory item and, in response, the inventory management system:
   changing a price associated with the inventory item to a sale price for the inventory item;
   generating an item price notification comprising the sale price for the inventory item within the expiration threshold; and
   transmitting the item price notification to the mobile device.

2. The method of claim 1 further comprising the inventory management system updating the inventory database to reflect the sale price for the inventory item.

3. The method of claim 2, wherein the updating comprises the inventory management system updating the inventory database to temporarily reflect the sale price for the inventory item.

4. The method of claim 3, wherein the updating comprises the inventory management system updating the inventory database to temporarily reflect the sale price for the inventory item until a quantity for the inventory item is sold.

5. The method of claim 2, wherein the updating comprises the inventory management system updating the inventory database to permanently reflect the sale price for the inventory item.

6. The method of claim 1, further comprising the inventory management system;
   monitor the inventory database in response to the inventory management system being notified that a customer information card has been swiped at a terminal that is in communication with the inventory management system; and
   requesting the shopping list from the mobile device.

7. The method of claim 1, wherein the inventory management system transmitting the item price notification to the mobile device comprises the inventory management system transmitting the item price notification to the mobile device via a messaging center of a wireless communications network using a wireless messaging protocol.

8. A computer-readable medium comprising computer-executable instructions that, when executed, perform the steps of:
   monitoring, in response to receiving a shopping list from a mobile device, an inventory database to determine if a present date is within an expiration threshold assigned to an inventory item identified in the shopping list, the expiration threshold comprising an expiration date for the inventory item;
   determining that the present date is within the expiration threshold assigned to the inventory item and, in response:
   changing a price associated with the inventory item to a sale price for the inventory item;
   generating an item price notification comprising the sale price for the inventory item within the expiration threshold; and
   transmitting the item price notification to a the mobile device.

9. The computer-readable medium of claim 8, wherein the computer-executable instructions, when executed, further perform the step of updating the inventory database to reflect the sale price for the inventory item.

10. The computer-readable medium of claim 8, wherein the computer-executable instructions, when executed, further perform the steps of:
    monitoring the inventory database in response to the inventory management system being notified that a customer information card has been swiped at a terminal that is in communication with the inventory management system; and
    requesting the shopping list from the mobile device.

11. An inventory management system for delivering an item price notification to a mobile device, the system comprising:
    a processor;
    a memory, in communication with the processor, the memory being configured with:
    an inventory database comprising a price for an inventory item; and
    instructions that, when executed by the processor, perform the steps of:
    monitoring, in response to receiving a shopping list from the mobile device the inventory database to determine if a present date is within an expiration threshold assigned to an inventory item identified in the shopping list, the expiration threshold comprising an expiration date for the inventory item;
    determining that the present date is within the expiration threshold assigned to the inventory item and, in response:
    changing the price associated with the inventory item to a sale price for the inventory item;
    generating an item price notification comprising the sale price for the inventory item within the expiration threshold; and
    transmitting the item price notification to the mobile device.

12. The inventory management system of claim 11, wherein the memory is further configured to store instructions that, when executed by the processor, perform the additional step of updating the inventory database to reflect the sale price for the inventory item.

13. The inventory management system of claim 11, wherein the memory is further configured with instructions that, when executed by the processor, perform the additional steps of:
    monitoring the inventory database in response to the inventory management system being notified that a customer information card has been swiped at a terminal that is in communication with the inventory management system; and
    requesting the shopping list from the mobile device.

14. An inventory management system for delivering an item price notification to a mobile device, the system comprising:
- a processor;
- a memory, in communication with the processor, the memory being configured with:
  - an inventory database comprising a price for an inventory item; and
  - instructions that, when executed by the processor, perform the steps of:
    - accessing a customer information database to retrieve a purchase history for a customer;
    - monitoring the inventory database to determine if a present date is within an expiration threshold assigned to an inventory item that was previously purchased by the customer as identified in the purchase history, the expiration threshold comprising an expiration date for the inventory item;
    - determining that the present date is within the expiration threshold assigned to the inventory item and, in response:
      - changing the price associated with the inventory item to a sale price for the inventory item;
      - generating an item price notification comprising the sale price for the inventory item within the expiration threshold; and
      - transmitting the item price notification to the mobile device.

15. The inventory management system of claim 14, wherein the memory is further configured to store instructions that, when executed by the processor, perform the additional step of updating the inventory database to reflect the sale price for the inventory item.

16. A computer-readable medium for delivering an item price notification to a mobile device, the computer-readable medium comprising computer-executable instructions that, when executed, perform the steps of:
- accessing a customer information database to retrieve a purchase history for a customer;
- monitoring the inventory database to determine if a present date is within an expiration threshold assigned to an inventory item that was previously purchased by the customer as identified in the purchase history, the expiration threshold comprising an expiration date for the inventory item;
- determining that the present date is within the expiration threshold assigned to the inventory item and, in response:
  - changing the price associated with the inventory item to a sale price for the inventory item;
  - generating an item price notification comprising the sale price for the inventory item within the expiration threshold; and
  - transmitting the item price notification to the mobile device.

17. The computer-readable medium of claim 16, wherein the computer-executable instructions, when executed, further perform the step of updating the inventory database to reflect the sale price for the inventory item.

18. A method for delivering an item price notification to a mobile device, the method comprising:
- accessing, by an inventory management system, a customer information database to retrieve a purchase history for a customer;
- monitoring, by the inventory management system, the inventory database to determine if a present date is within an expiration threshold assigned to an inventory item that was previously purchased by the customer as identified in the purchase history, the expiration threshold comprising an expiration date for the inventory item;
- determining, by the inventory management system, that the present date is within the expiration threshold assigned to the inventory item and, in response, the inventory management system:
  - changing the price associated with the inventory item to a sale price for the inventory item;
  - generating an item price notification comprising the sale price for the inventory item within the expiration threshold; and
  - transmitting the item price notification to the mobile device.

19. The method of claim 18 further comprising the inventory management system updating the inventory database to reflect the sale price for the inventory item.

20. The method of claim 19, wherein the updating comprises the inventory management system updating the inventory database to temporarily reflect the sale price for the inventory item.

21. The method of claim 20, wherein the updating comprises the inventory management system updating the inventory database to temporarily reflect the sale price for the inventory item until a quantity for the inventory item is sold.

22. The method of claim 19, wherein the updating comprises the inventory management system updating the inventory database to permanently reflect the sale price for the inventory item.

23. The method of claim 18, wherein the inventory management system transmitting the item price notification to the mobile device comprises the inventory management system transmitting the item price notification to the mobile device via a messaging center of a wireless communications network using a wireless messaging protocol.

* * * * *